United States Patent [19]
Wendt

[11] 4,319,167
[45] Mar. 9, 1982

[54] HIGH FREQUENCY FERRORESONANT POWER SUPPLY FOR A DEFLECTION AND HIGH VOLTAGE CIRCUIT

[75] Inventor: Frank S. Wendt, Princeton, N.J.
[73] Assignee: RCA Corporation, New York, N.Y.
[21] Appl. No.: 144,150
[22] Filed: Apr. 28, 1980

Related U.S. Application Data
[63] Continuation of Ser. No. 7,815, Jan. 30, 1979, abandoned.

[51] Int. Cl.³ .......................................... H01J 29/70
[52] U.S. Cl. ................................ 315/411; 358/190
[58] Field of Search ................ 315/408, 411; 358/190

[56] References Cited

U.S. PATENT DOCUMENTS
3,798,497 3/1974 Manske .
3,868,538 2/1975 Blanchard ............................ 315/411
4,079,295 3/1978 Den Hollander ..................... 315/411

FOREIGN PATENT DOCUMENTS
2649910 5/1977 Fed. Rep. of Germany .
2606351 8/1977 Fed. Rep. of Germany .
1255239 12/1971 United Kingdom .
1329983 9/1973 United Kingdom .
1415316 11/1975 United Kingdom .
1445114 8/1976 United Kingdom .
1524723 9/1978 United Kingdom .

OTHER PUBLICATIONS
F. A. Benson, Voltage Stabilization, pp. 237-242.
T. Kadota et al., Stabilized Power Supply Incorporating High-Frequency Ferro-Resonance Transformer, 10/7/77, Convention of Institute of Television Engineers of Japan.

*Primary Examiner*—Theodore M. Blum
*Attorney, Agent, or Firm*—Eugene M. Whitacre; Paul J. Rasmussen; Joseph Laks

[57] ABSTRACT

A high frequency ferroresonant transformer is driven by a high frequency power source coupled to a drive winding of the ferroresonant transformer. Around saturating portions of the core are wound a low voltage winding for providing a B+ scanning voltage and a high voltage winding for providing an ultor voltage. Tuning of the ferroresonant transformer for regulating the B+ and ultor voltages may be provided by the high voltage winding distributed capacitance, for example, or by a discrete capacitor coupled across a winding associated with the saturating portions of the core, for example.

26 Claims, 5 Drawing Figures

HIGH FREQUENCY FERRORESONANT POWER SUPPLY FOR A DEFLECTION AND HIGH VOLTAGE CIRCUIT

This is a continuation of application Ser. No. 007,815, filed Jan. 30, 1979, now abandoned.

BACKGROUND OF THE INVENTION

This invention relates to a high frequency ferroresonant power supply for a deflection and high voltage circuit.

In deflection and high voltage power supplies for television receivers, the B+ supply voltage for the deflection circuitry and the high voltage ultor accelerating potential typically are derived in two different manners. The B+ voltage is derived from the AC line mains which is rectified and filtered; whereas the ultor accelerating potential is derived from rectified flyback pules obtained from a horizontal output or flyback transformer. With such an arrangement, two relatively independent and costly power supplies must be used.

To regulate the high voltage, either the high voltage itself is regulated directly or the B+ voltage is regulated typically through relatively complex electronic series switching, or shunt regulators. Such circuits are relatively costly and subject to failures which require additional protective circuitry to disable the television receiver under abnormal increases in high voltage.

Many television receivers include circuitry to maintain a constant raster width with varying ultor beam current. This can be accomplished by altering the B+ raster voltage so that it tracks the changing ultor voltage in such a way that the raster width and thus the picture size remains constant with changing ultor voltage. Typically, the B+ voltage change is accomplished by inclusion of a series resistor conductively coupled to the flyback transformer primary winding or by use of additional B+ regulator control circuitry which senses beam current variations and correspondingly changes the B+ voltage. In the former approach, power may be unnecessarily dissipated in the series resistor, while in the latter approach additional circuit complexity and cost may be incurred.

Some B+ regulators employ a 60 Hz AC line mains regulating transformer, such as a 60 Hz ferroresonant transformer, to provide a regulated B+ voltage. Because operation is at the low frequency of 60 Hz, a relatively large and heavy transformer must be used. Furthermore, the high voltage is then independently supplied by means of a relatively large flyback transformer designed to accommodate relatively large power flows.

Other television receiver regulator circuits discussed in the prior art, regulate the high voltage by providing a flyback transformer which itself is operated in the ferroresonant mode. Flyback pulses are coupled to the flyback primary winding. The ultor high voltage winding is then tuned to the desired frequency. Because the B+ supply is derived from a separate source such as the AC line mains supply, a separate regulator circuit must be provided if the B+ voltage is also to be regulated. If the B+ voltage is unregulated, other circuitry may be required to maintain a constant raster width.

In many typical flyback derived high voltage circuits, the high voltage provides a peak voltage substantially less than the required ultor potential in order to reduce the number of turns required of the high voltage winding. A high voltage multiplier then steps up the voltage to the required level. Since the design of many voltage multipliers requires that both polarities of the AC voltage be used, it is desirable for the multiplier to be driven by an AC voltage with positive and negative polarities close to being equal. If one polarity is much smaller than the other, the capacitors and diodes active during this polarity contribute very little voltage step up. This is the situation when using the flyback pulse as a source for a voltage multiplier circuit. A sextupler multiplier using six diodes and six capacitors is required to obtain a three times multiplication when a low duty cycle flyback pulse is applied to a voltage multiplier.

SUMMARY OF THE INVENTION

A high frequency ferroresonant power supply for a deflection and high voltage circuit comprises a first winding of a high frequency ferroresonant transformer coupled to a source of high frequency alternating current voltage. A high voltage winding provides an ultor voltage and a low voltage winding provides a B+ scan supply voltage. A resonating capacitance saturates the magnetic core portions under both high and low voltage windings for regulating both the ultor and B+ voltages.

DESCRIPTION OF THE INVENTION

Figure 1:
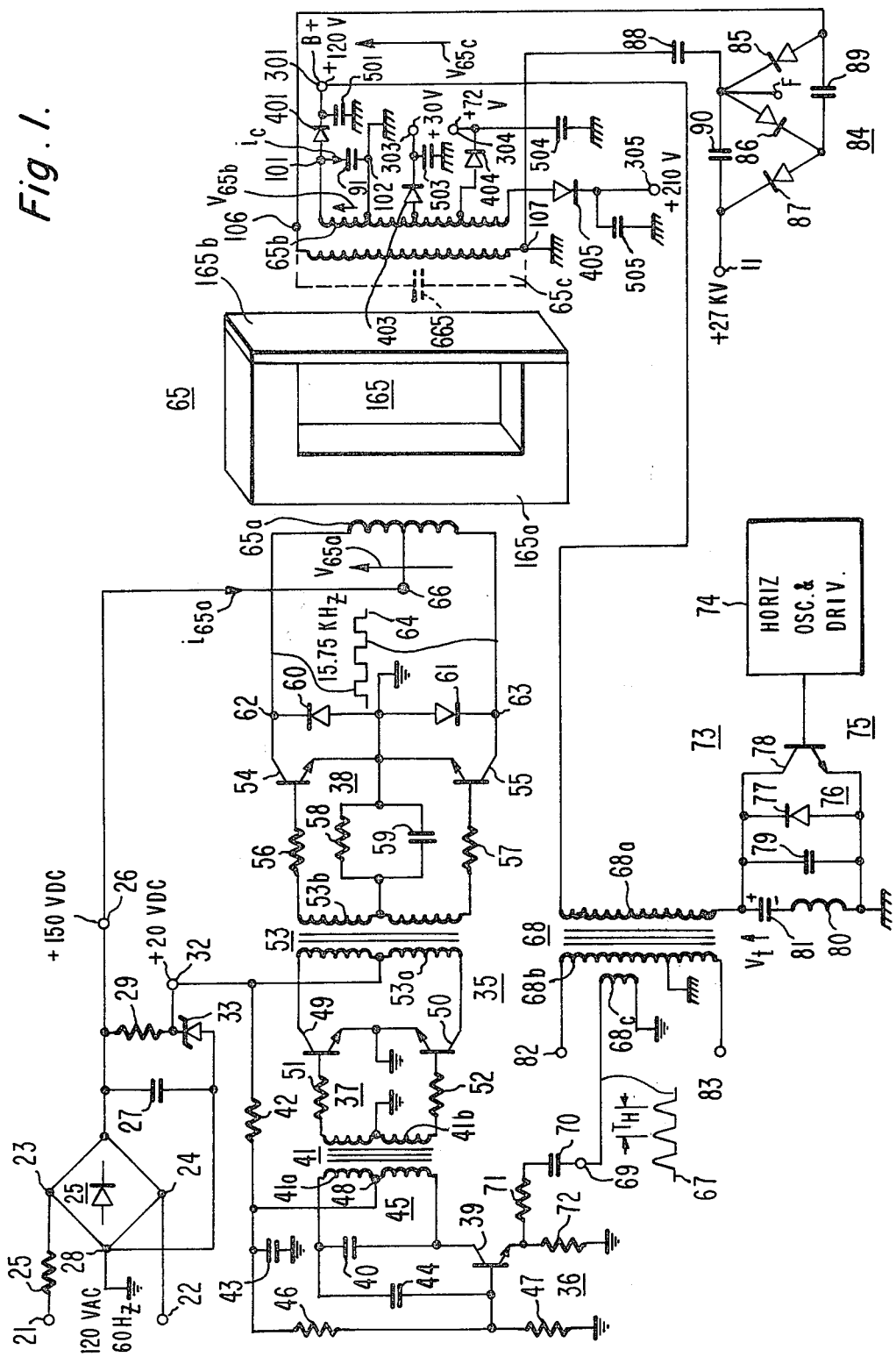
FIG. 1 illustrates an electrical schematic of a high frequency ferroresonant power supply for a deflection and high voltage circuit embodying the invention.

In FIG. 1, AC line mains voltage of illustratively 120 VAC, 60 Hz, is coupled to terminals 21 and 22 and then to input terminals 23 and 24 of a full-wave bridge rectifier 25. A current limiting resistor 25 is coupled between terminals 21 and 23. A DC voltage of illustratively +150 VDC is developed at a terminal 26 and is filtered by a capacitor 27 coupled across terminal 26 and a terminal 28 which is the common ground current return terminal not isolated from the AC line mains supply. A resistor 29 is coupled to the +150 volt supply terminal 26. A low DC voltage supply of illustratively +20 DVC is developed at a terminal 32, the cathode of a zener diode 33 that is coupled to resistor 29.

A high frequency square-wave power oscillator 35 comprises a sinewave oscillator 36, a push-pull squaring stage 37 and a power output stage 38. Sinewave oscillator 36 is self-oscillating and comprises a transistor 39 with a collector electrode coupled to a resonant LC tank circuit 45 comprising a capacitor 40 and a winding 41a of a coupling transformer 41. Collector voltage for transistor 39 is obtained from the +20 volt supply that is coupled to a tap terminal 48 of winding 41a through a resistor 42. A bypass capacitor 43 is coupled to tap terminal 48. Resistor 42 reduces the 20 V to 17 V and capacitor 43 aids in filtering of the rectified 60 Hz input voltage. AC feedback for maintaining oscillator 36 in a self-oscillating mode is provided by a capacitor 44 coupled between tank circuit 45 and the base electrode of transistor 39. DC bias for the base electrode is provided by voltage dividing resistors 46 and 47 coupled to resistor 42.

Oscillator 36 develops a high frequency sinusoidal voltage in winding 41a. The resonant frequency of tank circuit 45 is selected, for example, to be close to the horizontal deflection frequency, $1/T_H$, of approximately 15.75 kilohertz. Horizontal retrace pulses 67 obtained from a utility horizontal flyback transformer 68 is coupled to a synchronizing input terminal 69 of oscillator 36. Retrace pulses 67 are AC coupled from terminal 69 to the emitter of transistor 39 through a capacitor 70 and a resistor 71 of voltage dividing resistors 71 and 72. Retrace pulses 67 synchronize the frequency of oscillator 36 to the horizontal deflection frequency by turning off transistor 39 within the horizontal retrace interval.

The high frequency sinusoidal voltage in winding 41a of oscillator 36 is coupled by means of a winding 41b of transformer 41 to the bases of push-pull transistors 49 and 50 respectively through resistors 51 and 52. A center tap of winding 41b is grounded. Squaring stage 37 converts the sinusoidal voltage developed by oscillator 36 into a square-wave voltage of the same frequency, the square-wave voltage being more suitable than a sinewave for driving power output stage 38.

The high frequency square-wave voltage developed by squaring stage 37 is coupled from a winding 53a of a coupling transformer 53 to the bases of push-pull power output transistors 54 and 55 through a winding 53b of transformer 53 and through respective resistors 56 and 57. A resistor 58 and a capacitor 59 coupled in parallel are coupled between the center tap of winding 53b and the common junction point of the emitters of transistors 54 and 55. Resistor 58 and capacitor 59 function to provide a negative bias voltage at the bases of the power output transistors.

A diode 60 is coupled across the collector-emitter electrodes of transistor 54, with the cathode of diode 60 coupled to the collector of transistor 54. Similarly a diode 61 is coupled across the collector-emitter electrodes of transistor 55 with the cathode of diode 61 coupled to the collector of transistor 55. Diodes 60 and 61 function to limit the peak voltage of undesirable voltage spikes which might damage the transistors.

Power output stage 38 provides a high frequency alternating square wave voltage 64 at its output terminals 62 and 63, the collector electrodes respectively of transistors 54 and 55. Voltage 64 functions as a source of unregulated energy or as an excitation voltage for a high frequency ferroresonant transformer 65. An input or primary winding 65a is coupled across output terminals 62 and 63 of power output stage 38. The supply voltage for power output stage 38 is obtained from the unregulated +150 volts DC at terminal 26 which is coupled to a center tap terminal 66 of primary winding 65a.

Figure 2:
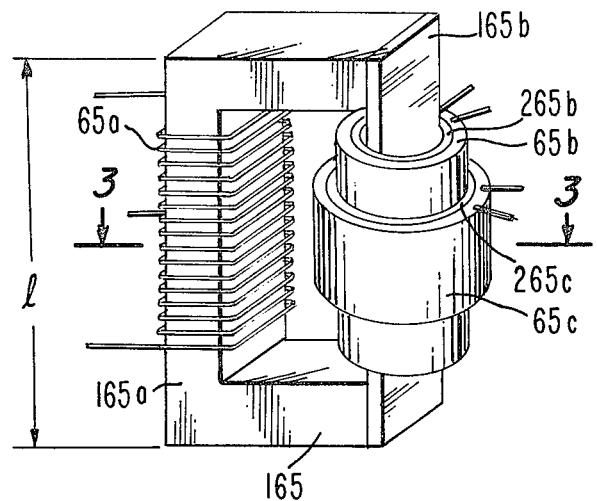
FIG. 2 illustrates a high frequency ferroresonant transformer core and winding structure used in the circuit of FIG. 1.

High frequency ferroresonant transformer 65 comprises primary winding 65a, a low voltage secondary winding 65b, a high voltage secondary winding 65c, and a magnetic core 165. As illustrated in FIG. 2, magnetic core 165 comprises two core portion 165a and 165b. Core portion 165a is formed as a C-shaped member. Core portion 165b is formed as a relatively thin rectangular slab of magnetic material with a relatively large surface area to volume ratio.

Figure 4:
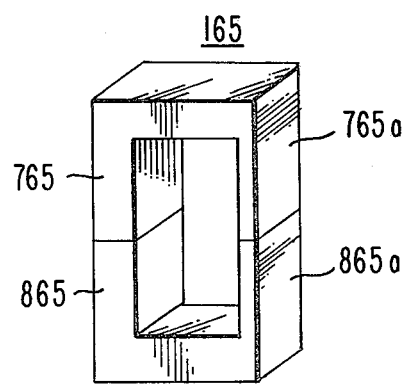
FIG. 4 illustrates a different core arrangement for the transformer of FIG. 2.

As illustrated in FIG. 2, primary winding 65a is wound around the center section of C-shaped core portion 165a. Low voltage winding 65b is wound around slab core portion 165b. High voltage winding 65c is concentrically wound around low voltage winding 65b. Each of the secondary windings 65b and 65c may be layer wound around cylindrical coil forms 265b and 265c respectively. Other suitable winding arrangements may be substituted, as, for example, high voltage winding 65c being layer wound directly over low voltage winding 65b. Segmented pi windings for low and high voltage windings may also be used. Alternatively as illustrated in FIG. 4, core 165 may be a rectangular core formed of 2 C-cores 765 and 865 butted together along their outer legs with the outer legs 765a and 865a of the two C-cores being of reduced cross-sectional area. Low voltage winding 65b and high voltage winding 65c, not illustrated in FIG. 4, are then concentrically wound around legs 765a and 865a as in FIG. 2, with drive coil 65a being wound around the opposite leg as shown in FIG. 2.

As illustrated in FIG. 1, a lead conductor of low voltage winding 65b is coupled to a terminal 101 and another lead conductor is coupled to a ground current return reference terminal 102 that is conductively isolated from the AC line mains supply. This terminal may be at earth ground potential. Low voltage winding 65b is coupled to a scan supply voltage terminal 301 through a half-wave rectifier 401. The high frequency alternating current voltage developed by low voltage winding 65b across terminals 101 and 102 is half-wave rectified by rectifier 401 and filtered by a capacitor 501. A B+ scan supply voltage of illustratively +120 volts DC is produced at scan supply voltage terminal 301.

Other leads of low voltage winding 65b are brought out from the winding buildup and are coupled to respective rectifiers 403–405 to provide low DC voltages of +30 volts, +72 volts and +210 volts at respective terminals 303–305. Filter capacitors 503–505 are respectively coupled to the cathodes of diodes 403–405.

A horizontal deflection circuit 73 comprises a conventional horizontal oscillator and driver circuit 74, a deflection trace switch 76 comprising a damper diode 77 and a horizontal output transistor 78, a horizontal retrace capacitor 79, and a series coupled arrangement of a horizontal deflection winding 80 and a trace capacitor 81. The voltage $V_t$ across trace capacitor 81 functions as a source of trace voltage for horizontal deflection winding 80. During each horizontal trace interval, trace switch 76 is conducting and couples the trace voltage $V_t$ across horizontal deflection winding 80, thereby developing the required horizontal sawtooth scanning current in the deflection winding.

To obtain the trace voltage $V_t$, trace capacitor 81 is coupled to the B+ scan supply voltage terminal 301 through the primary winding 68a of utility flyback transformer 68. Thus the average or DC value of trace voltage $V_t$ substantially equals the B+ scan supply voltage of +120 volts DC.

During the horizontal retrace interval, with trace switch 76 cut off, horizontal deflection winding 80 and horizontal retrace capacitor 79 resonate for one-half cycle of oscillation. The horizontal retrace pulses developed in primary winding 68a of utility flyback transformer 68 are transformer coupled to flyback secondary windings 68b and 68c. Terminals 82 and 82 of secondary winding 68b couple utility retrace pulses to such circuitry as the blanking and horizontal sync circuits. Secondary winding 68c functions as the source of retrace pulses 67 used to synchronize oscillator 36 of the high frequency square-wave power oscillator 35.

In many conventional television receiver power supply circuits, the ultor accelerating potential is derived from rectified retrace pulses. In the circuit of FIG. 1, however, it is the high frequency alternating current high voltage developed across high voltage winding 65c that generates the ultor voltage. This alternating current high voltage developed across terminals 106 and 107 is rectified and multiplied by a voltage multiplier circuit 84 comprising 3 diodes 85–87 and 3 capacitors 88–90. The cathode of diode 87 is coupled to an ultor terminal U, at which terminal an ultor accelerating potential of illustratively +27 kilovolts DC is developed. An intermediate DC high voltage developed at the cathode of diode 85 serves as a focus voltage for the focus electrode of a television receiver cathode ray tube.

With ferroresonant transformer 65 providing both a high voltage in high voltage secondary winding 65c and a low voltage in secondary winding 65b, both the ultor accelerating potential and the B+ scan supply voltages are regulated without the necessity of relatively complex and failure prone electronic regulator circuitry. To regulate the voltages across windings 65b and 65c, a resonating capacitor 91 may be coupled to low voltage winding 65b at terminal 101, as illustrated in FIG. 1, or to another winding wound around thin slab core portion 165b. The value of capacitor 91 is selected such that capacitor 91 and low voltage winding 65b resonate near the frequency of the excitation source, that is, near the 15.75 kHz frequency of the high frequency alternating current voltage 64. Under certain circumstances, as described below, capacitor 91 may be omitted thus reducing cost. If sufficient winding capacitance exists in the high voltage coil for tuning, an additional capacitor will be unnecessary.

The circulating resonant current flowing in winding 65b and capacitor 91 aids in magnetically saturating the core under both low voltage winding 65b and high voltage winding 65c each half-cycle of the circulating current oscillation. By so saturating the core, the induced voltage in both windings 65b and 65c are thereby regulated.

Figure 5:
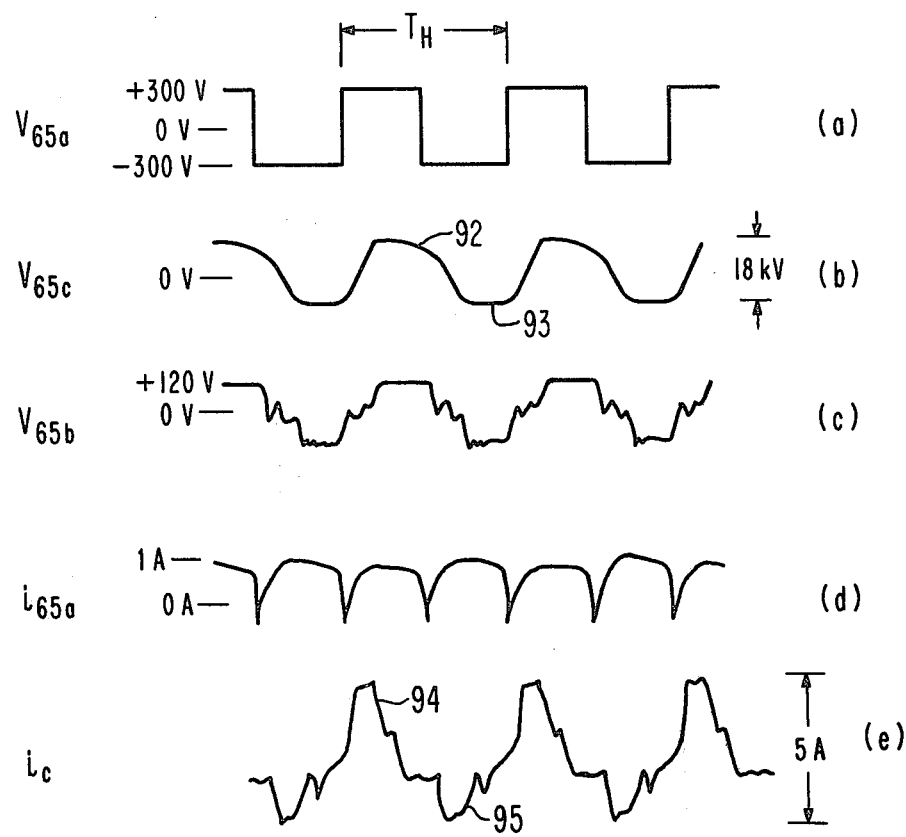
FIG. 5 illustrates waveforms associated with the circuit of FIG. 1.

As illustrated in FIG. 5a, the voltage $V_{65a}$ which appears across primary winding 65a of the high frequency ferroresonant transformer 65 is a symmetrical square wave voltage of frequency 15.75 kHz with a period of $T_H = 63.5$ microsecond. The high voltage across winding 65c is also a relatively symmetrical square wave voltage $V_{65c}$ as illustrated in FIG. 5b. The square-wave developed by low voltage winding 65b across terminals 101 and 102 is illustrated in FIG. 5c, with the flat topped portion occurring during conduction of rectifier 401. The input current $i_{65a}$ to primary winding 65a is illustrated in FIG. 5d and is a relatively constant current except near the switching instants of transistors 54 and 55, near the leading and trailing edges of waveform $V_{65a}$ of FIG. 5a.

The resonant or circulating current $i_c$ flowing in capacitor 91 and low voltage winding 65b between terminals 101 and 102, illustrated in FIG. 5e, aids in magnetically saturating the core portion 165b under both high voltage winding 65c and low voltage winding 65b. Saturation will occur near the peak portions 94 and 95 of the circulating current waveform $i_c$.

Figure 3:
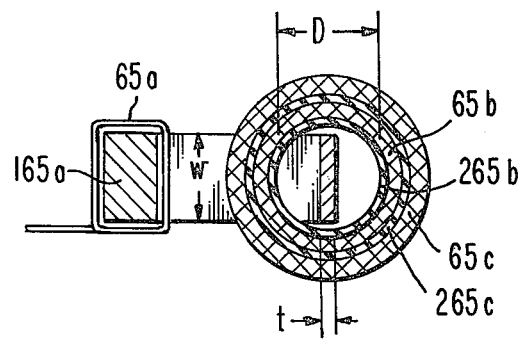
FIG. 3 illustrates a cross-section of the transformer of FIG. 2 along the line 3—3.

To provide for saturation of core portion 165b while the core portion 165a under primary winding 65a remains unsaturated, the cross-sectional area of slab 165b of FIG. 2 is made smaller than the cross-sectional area of C-core 165a. As illustrated in FIG. 3 by the sectional view taken along the line 3—3 of FIG. 2, the cross-sectional area $a = (t).(w)$, the product of the thickness t and width w of slab 165b, is relatively much smaller than the cross-sectional area $A = w^2$, the square of the sides of C-core 165a. For the value listed below a/A equals approximately 0.19.

It may be desirable to limit the temperature increase in the saturating core portion 165b under low voltage winding 65b and high voltage winding 65c after energization of the circuit of FIG. 1. The saturation flux density $B_{sat}$ of the core material decreases with increasing temperature. Because in a ferroresonant transformer the voltages developed across secondary windings 65b and 65c is a function of $B_{sat}$, it may be desirable to limit the temperature rise by providing a secondary winding and core structure with increased cooling capability. This temperature rise may occur due to increased core losses at high frequency operation and due to relatively large $I^2R$ losses from such factors as the relatively large high frequency saturating circulating current.

As illustrated in FIGS. 2 and 3 core portion 165b comprises a thin slab of thickness t, width w, and length l. With typical values listed below, the surface area to volume ratio of slab 165b is relatively large, 40 to 1, for example, thereby permitting increased cooling of the thin slab.

Furthermore, the inner diameter D of cylindrical coil form 265b is also larger than the thickness t of slab 165b, thereby permitting windings 65b and 65c to be loosely wound around slab core portion 165b with a relatively large air spacing between the windings and the core. Convective cooling of the core is thereby enhanced. Such a core configuration is described in copending U.S. patent application Ser. No. 7,814 filed Jan. 30, 1979, U.S. Pat. No. 4,262,245 entitled *HIGH FREQUENCY FERRORESONANT TRANSFORMER*, by F. S. Wendt, said application incorporated by reference.

If a core temperature increase is of relatively little concern, a conventional core geometry for core portion 165b may be used such as a square or circular cross-section with the windings 65b and 65c more tightly wound around the core.

As illustrated in FIG. 5b, the high voltage $V_{65c}$ across high voltage winding 65c is a relatively symmetrical square wave with positive magnitude portion 92 approximately equal to that of negative magnitude portion 93. With a peak-to-peak voltage swing of 18 kilovolts for $V_{65c}$, for example, only three rectifiers and two or three capacitors are required in high voltage multiplier 84 of FIG. 1 to obtain an ultor voltage of +27 kilovolts, for example. Diodes 85 and 87 rectify the positive portions of $V_{65c}$, whereas diode 86 rectifies the negative portion. Thus, the ultor voltage equals approximately twice the positive magnitude of $V_{65c}$ added to the negative magnitude. Capacitor 90 may be omitted if the ultor aquadag provides sufficient filtering capacitance. Conventional high voltage supplies which rectify positive retrace pulses of the same magnitude as that of positive portion 92 of FIG. 5b may require 5 or 6 diodes and associated capacitors in the multiplier arrangement to obtain the same ultor voltage.

The described high frequency ferroresonant transformer system embodying the invention provides a regulated B+ scan supply voltage and thus a regulated trace voltage $V_t$, and also provides a regulated high voltage. With such an arrangement, the design criteria for horizontal deflection circuit 73 may be considerably relaxed. For example, with flyback transformer 68 no longer required to transfer load energy to the ultor, the flyback transformer may be considerably reduced in size, as relatively little load current flows in the flyback transformer. With little DC current flowing through horizontal output transistor 78, its size, current and voltage ratings and heat sinking requirements are reduced. With suitable circuit redesign, a low impedance deflection winding 80 may be used, which would then require a much lower voltage peak of 200 V, illustratively, instead of the relatively large horizontal retrace pulse of 1,000 V typically being developed.

With the high frequency ferroresonant transformer 65 supplying both the B+ scan supply voltage and the ultor high voltage, relatively good picture width stability may be obtained without the use of electronic control circuitry or discrete series resistances. As beam loading of the ultor terminal U increases, the ultor accelerating potential decreases. The increased DC portion of the load current flowing in high voltage winding 65c acts to demagnetize somewhat core portion 165b and to shift the operating point of that core portion away from greater saturation slightly towards the knee of the transformer B-H hysteresis loop, thereby decreasing the high voltage somewhat. However, with low voltage winding 65b and high voltage winding 65c sharing a common saturating core portion, increased load current flowing in winding 65c will also decrease the B+ scan voltage, thereby providing substantial raster width regulation.

Alternatively explained, the existing leakage inductances in the transformer 65 provide an increased voltage drop with increased video beam loading causes both the high voltage and the B+ voltage to decrease. The leakage inductance between the high and low voltage windings 65b and 65c and the degree and location of core saturation are adjusted for providing raster width regulation.

A relatively large number of winding turns is required to develop the relatively high voltage across high voltage winding 65c. By proper choice of such factors as winding buildup, layer separation and conductor wire size, the interwinding stray or distributed capacity may be sufficiently large to enable the high voltage winding 65c to resonate and saturate core portion 165b and thus regulate the voltages in both the high and low voltage windings. Such distributed resonating capacitance is illustrated in FIG. 1 by a capacitor 665 coupled across high voltage winding 65c, although in actuality the total capacitance is distributed along the winding turns.

With the distributed capacity 665 and high voltage winding 65c providing the circulating current for saturating core portion 165b, capacitor 91 is no longer required. Aging or failure of discrete components that may cause an increase of the high voltage is eliminated. Furthermore, using a ferroresonant transformer to provide the high voltage provides intrinsic high voltage protection capability, as changes in a winding inductance or in the capacitance value of a resonant capacitance will typically result in a loss of ferroresonant operation and a decrease of the winding voltage.

With ferroresonant transformer 65 providing both the high voltage and the B+ scan supply voltage, a relatively large core temperature rise after initial circuit energization may be tolerated without substantially affecting raster width. Because the high voltage winding 65c and low voltage winding 65b are wound around a common core portion 165b, a decrease in $B_{sat}$ with an increase in core temperature decreases both the ultor and the B+ voltages, thereby providing a substantial degree of raster width regulation.

Typical values for a high frequency ferroresonant transformer 65 as illustrated in FIGS. 1-3 and using the distributed capacitance 665 associated with high voltage winding 65c, are as follows:

CORE 165: C-core portion 165a with a cross-sectional area of 0.360 square inch, outer leg length of 2.0 inch and center section length of 2.8 inch; thin slab core portion 165b of thickness t=0.110 inch, width w=0.610 inch, length l=2.8 inch, cross-sectional area of 0.067 square inch; core material is a ferrite with $B_{sat}$ of around 4000 gauss at 25° C., such as Ferroxcube 3E2A from Ferroxcube Corporation, Saugerties, New York of such as RCA 540 from RCA Corporation, Indianapolis, Ind.

PRIMARY WINDING 65a: 30/40 Litz nylon wrap insulated enameled copper wire, layer wound with four layers, center tapped, bifilar wound, 200 turns total, with no insulating layers between winding layers; winding length of 1.55 inch.

LOW VOLTAGE WINDING 65b: cylindrical coil form 265b with an inner diameter D=0.715 inch, outer diameter of 0.850 inch; and a length of 1.675 inch. Winding 65b with 25/38 Litz nylon wrap insulated enameled copper wire, bifilar, layer wound, with 190 turns total with four layers of about 48 turns in each layer; a fifth layer of four turns provides a cathode ray tube filament voltage of approximately 6.3 volts, 900 miliampere; winding length of 1.675 inch.

HIGH VOLTAGE WINDING 65c: cylindrical coil form 265c with an inner diameter of 1.150 inch, an annular thickness of 0.060 inch, and a length of 1.050 inch. Winding 65c of #38 gauge enameled copper wire, layer wound with 32 layers with 147 turns in first 31 layers and 43 turns in last layer, each layer separated from the other by a 0.002 inch to 0.004 inch mylar insulator; total number of winding turns equals 4600; winding length of 0.75 inch.

What is claimed is:

1. A ferroresonant power supply for a deflection and high voltage circuit, comprising:
a source of alternating current voltage;
a ferroresonant transformer comprising:
 a magnetic core;
 a first winding coupled to said source of alternating current voltage;
 a high voltage winding wound around a core portion of said magnetic core and coupled to a high voltage terminal for developing a high voltage;
 a second winding wound around a core portion of said magnetic core and coupled to a scan supply voltage terminal for developing a scan supply voltage; and
 means for providing sufficient capacitance to at least one winding of said ferroresonant transformer for generating circulating currents for saturating the core portions under said high voltage and second windings each cycle of said alternating current voltage for providing a regulated high voltage and a regulated scan supply voltage;
a deflection winding;

a deflection switch coupled to said deflection winding for generating trace and retrace intervals each deflection cycle;

a source of trace voltage coupled to said deflection winding for developing scanning current in said deflection winding;

first means for coupling said regulated scan supply voltage to said source of trace voltage to develop said trace voltage from said regulated scan supply voltage;

an ultor terminal for providing an ultor accelerating potential; and high voltage means coupled to said high voltage terminal and to said ultor terminal for developing said ultor accelerating potential from said regulated high voltage.

2. A supply according to claim 1 wherein said high voltage and second windings share a common saturating portion of said core.

3. A supply according to claim 3 wherein said high voltage winding is concentrically wound with said second winding.

4. A supply according to claims 1 or 2 wherein said means for providing sufficient capacitance comprises the distributed capacitance of said high voltage winding.

5. A supply according to claims 1 or 2 wherein said means for providing sufficient capacitance comprises a capacitor coupled to said second winding.

6. A supply according to claim 1 including a utility flyback transformer coupled to said deflection winding for providing utility retrace pulses.

7. A supply according to claim 6 wherein said first means comprises a first winding of said utility flyback transformer.

8. A supply according to claim 1 wherein said high voltage winding is magnetically coupled to said second winding to a degree sufficient to maintain a relatively constant raster width with variations in beam current loading of said ultor terminal.

9. A supply according to claim 8 wherein increased beam loading demagnetizes said core in a manner which decreases said ultor accelerating potential and scan supply voltages by amounts which maintain a relatively constant raster width.

10. A supply according to claim 1 wherein said high voltage comprises a relatively symmetrical AC high voltage.

11. A supply according to claim 10 wherein said second means comprises multiplier means for adding a first multiple of the magnitude of a first polarity of said AC high voltage to a second multiple of the magnitude of a second polarity of said AC high voltage to obtain said ultor accelerating potential.

12. A circuit according to claim 11 wherein said multiplier means adds twice the magnitude of a first polarity of said AC high voltage to the magnitude of a second polarity of said AC high voltage.

13. A supply according to claim 1 wherein said source of alternating current voltage comprises a square wave generator.

14. A supply according to claim 13 wherein the frequency of said alternating current voltage equals the horizontal deflection frequency.

15. A supply according to claim 1 wherein said core portions around which said high voltage and second windings are wound comprise a slab of magnetic material with a relatively large surface area to volume ratio for providing cooling of said slab.

16. A supply according to claim 15 wherein said core comprises a generally rectangular core, said slab comprising one leg of said core, said first winding wound around a nonsaturating leg of said core, said high voltage and second windings loosely wound around said slab.

17. A ferroresonant power supply for a deflection and high voltage circuit, comprising:

a source of alternating current voltage;

a ferroresonant transformer, comprising:

a magnetic core;

a first winding coupled to said source of alternating current voltage;

a high voltage winding coupled to a high voltage terminal for developing a high voltage;

a capacitance coupled to a winding of said ferroresonant transformer for resonating with said winding of said ferroresonant transformer for saturating a core portion associated with said high voltage winding each cycle of said alternating current voltage for regulating said high voltage; and a second winding of said ferroresonant transformer coupled to a scan supply voltage terminal for developing a scan supply voltage, a core portion associated with said second winding being saturated each cycle of said alternating current voltage for regulating said scan supply voltage;

a deflection winding;

a deflection switch coupled to said deflection winding for generating trace and retrace intervals each deflection cycle;

a source of trace voltage coupled to said deflection winding for developing a scanning current in said deflection winding;

first means for coupling said regulated scan supply voltage to said source of trace voltage to develop said trace voltage from said regulated scan supply voltage;

an ultor terminal for providing an ultor accelerating potential; and high voltage means coupled to said high voltage terminal and to said ultor terminal for developing said ultor accelerating potential from said regulated high voltage.

18. A deflection circuit and saturating transformer regulated power supply therefor which provides scanning and cathode ray tube ultor voltages, comprising:

a source of alternating polarity voltage;

a transformer including magnetizable core and a plurality of windings including a primary winding coupled to said source and wound around a first core section, and low and high voltage secondary windings wound around a portion of a second core section, current that flows in said primary winding from said source generating magnetic flux in said core that develops low and high voltages, respectively, across said low and high voltage windings;

a capacitance coupled to one of said plurality of windings that is wound around a portion of said second core section, current that flows in said one winding generating a magnetic flux in said second core section that aids in magnetically saturating at least part of said second core section each cycle of said alternating polarity voltage to provide regulation of said low and high voltages;

means coupled to said low voltage winding for developing said scanning voltage from said regulated low voltage;

a deflection winding;

a trace switch coupled to said deflection winding and to said scanning voltage developing means for applying said scanning voltage to said deflection winding each deflection cycle to generate scanning current in said deflection winding;

a cathode ray tube ultor terminal; and means coupled to said high voltage winding and to said ultor terminal for developing said ultor voltage at said ultor terminal from said regulated high voltage.

19. A deflection circuit and regulated power supply therefor in accordance with claim 18 wherein said alternating polarity voltage comprises a substantially symmetrical square-wave voltage.

20. A deflection circuit and regulated power supply therefor in accordance with claim 19 including resonant retrace means coupled to said deflection winding and a flyback inductance coupled between said transformer low voltage winding and said deflection winding, said resonant retrace means applying a retrace pulse voltage to said flyback inductance.

21. A deflection circuit and regulated power supply therefor in accordance with claim 20 wherein said ultor voltage developing means comprises high voltage rectification and multiplication means rectifying both polarities of said regulated high voltage.

22. A deflection circuit and regulated power supply therefor in accordance with claim 21 wherein said square-wave voltage repeats at a frequency not less than said deflection frequency.

23. A deflection circuit and regulated power supply therefor in accordance with claims 18 or 22 wherein said second core section comprises a thin slab with a thickness substantially less than a slab width to provide a substantial surface area to volume ratio and wherein the amount of thin slab located interior to at least one of said low and high voltage windings is substantially less than the space encompassed by said one winding so as to permit cooling of said thin slab.

24. A deflection circuit and regulated power supply therefor in accordance with claim 23 wherein space between the interior of said one of said low and high voltage windings and said slab is filled with a cooling fluid to provide convective cooling of said thin slab.

25. A deflection circuit and regulated power supply therefor in accordance with claim 18 wherein said source of alternating polarity voltage comprises a source of direct current voltage, switching means coupled to said source of direct current voltage and first winding of said transformer, a control circuit coupled to said switching means for periodically switching states of said switching means to periodically apply said direct current voltage to said first winding.

26. A deflection circuit and regulated power supply therefor in accordance with claim 25 including means for developing a signal synchronized with said scanning current and means for applying said signal to said control circuit for synchronizing the switching of said switching means with said scanning current.

* * * * *